(12) United States Patent
Agrawal et al.

(10) Patent No.: US 12,230,061 B2
(45) Date of Patent: Feb. 18, 2025

(54) ELECTRONIC DEVICE THAT PRESENTS CUSTOMIZED, AGE-APPROPRIATE AUGMENTED REALITY CONTENT

(71) Applicant: MOTOROLA MOBILITY LLC, Wilmington, DE (US)

(72) Inventors: Amit Kumar Agrawal, Bangalore (IN); Alexandre Neves Creto, Sao Paulo (BR)

(73) Assignee: Motorola Mobility LLC, Chicago, IL (US)

( * ) Notice: Subject to any disclaimer, the term of this patent is extended or adjusted under 35 U.S.C. 154(b) by 448 days.

(21) Appl. No.: 17/557,575

(22) Filed: Dec. 21, 2021

(65) Prior Publication Data

US 2023/0196834 A1    Jun. 22, 2023

(51) Int. Cl.
| | |
|---|---|
| *G06V 40/16* | (2022.01) |
| *G02B 27/00* | (2006.01) |
| *G02B 27/01* | (2006.01) |
| *G10L 25/54* | (2013.01) |
| *G10L 25/57* | (2013.01) |

(52) U.S. Cl.
CPC ....... *G06V 40/178* (2022.01); *G02B 27/0093* (2013.01); *G02B 27/017* (2013.01); *G06V 40/171* (2022.01); *G10L 25/54* (2013.01); *G10L 25/57* (2013.01); *G02B 2027/0138* (2013.01); *G02B 2027/014* (2013.01)

(58) Field of Classification Search
CPC .............. G06V 40/178; G06V 40/171; G02B 27/0093; G02B 27/017; G02B 2027/0138; G02B 2027/014; G10L 25/54; G10L 25/57

See application file for complete search history.

(56) References Cited

U.S. PATENT DOCUMENTS

| | | | | |
|---|---|---|---|---|
| 2017/0351909 A1* | 12/2017 | Kaehler | ................ | G06V 20/20 |
| 2018/0095635 A1* | 4/2018 | Valdivia | ............ | G02B 27/0093 |
| 2019/0171405 A1* | 6/2019 | Zenoff | .................. | G06F 1/1652 |
| 2022/0164156 A1* | 5/2022 | Fitzgerald | ............ | H04N 23/698 |
| 2022/0198831 A1* | 6/2022 | Coleman | ................ | G06V 40/19 |
| 2023/0058259 A1* | 2/2023 | Suneja | ................ | G06Q 50/265 |

FOREIGN PATENT DOCUMENTS

CA        3222267 A1 * 12/2022  ............ A61B 3/145

\* cited by examiner

*Primary Examiner* — Pinalben Patel
(74) *Attorney, Agent, or Firm* — Isidore PLLC

(57) ABSTRACT

An electronic device, computer program product, and method enable presentation of age-appropriate augmented reality (AR) content by determining an age of wearer of an AR display device. The electronic device communicatively connects an electronic device to the AR display device. In response to determining that the electronic device is communicatively coupled to the AR display, a controller of the electronic device monitors or checks for information that indicates, or correlates to, an age of a person wearing the first AR display device being below a threshold age. In response to receiving information indicating that the person is below the threshold age, the controller selects customized AR content, customized for the person based on the age of the person and any identified personal preferences of the person. The controller presents, at the AR display device, the customized AR content, customized based on the age of the person.

20 Claims, 11 Drawing Sheets

ELECTRONIC DEVICE THAT PRESENTS CUSTOMIZED, AGE-APPROPRIATE AUGMENTED REALITY CONTENT

BACKGROUND

1. Technical Field

The present disclosure relates generally to electronic devices, and more particularly to electronic devices that present augmented reality display content.

2. Description of the Related Art

Augmented reality (AR) display devices are becoming commercially available as an immersive environment for viewing natural imagery augmented by AR notifications. In certain implementations, user communication devices may connect to AR display devices to provide the AR notifications. Some of the content presented may be sourced from connected private networks or public networks, such as the Internet, which do not provide a filter on the available content for download and user consumption. For certain people, in particular younger users/consumers, the vast array of media content includes age-inappropriate content, such as explicit or vulgar content, prurient content and/or criminal content, which should not be presented to the younger consumer. To prevent un-supervised access to such content on a device owned by an adult or parent, communication devices provide user-authentication features, such as a lock screen presented by a touch display device that requires entry by the user of a required passcode, fingerprint, facial image, voice print, etc., to identify an authorized user and unlock device access to the online content. As an additional or alternate safeguard, browsers and other media content retrieval components can have age filters enabled to block presentation of age-inappropriate content. However, once authenticated access is provided to the adult's device and/or the device is left open to access content without the filter, the unfiltered content is presented to the AR display device regardless of the age of the wearer of the AR display device.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
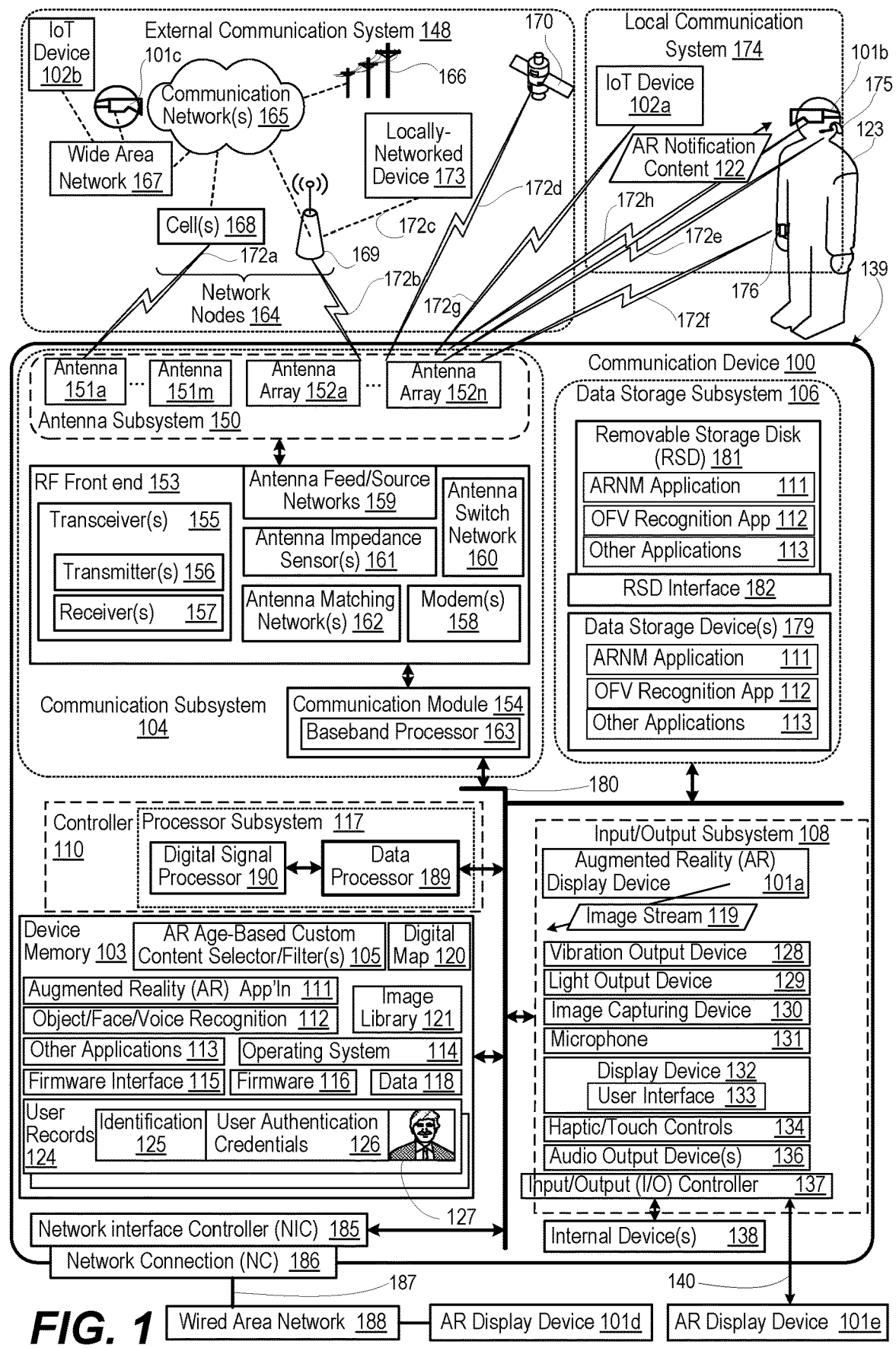
FIG. 1 depicts a functional block diagram of a communication environment including a communication device having components that provides customized, augmented reality (AR) notifications at AR display device(s), and within which the features of the present disclosure are advantageously implemented, according to one or more embodiments.

According to a first aspect of the present disclosure, an electronic device, a computer program product, and a method provide automatic age determination of a person wearing an augmented reality (AR) display device to trigger/implement age-appropriate custom content selecting/filtering. The electronic device includes at least one communication interface that communicatively connects the electronic device to one or more AR display devices including a first AR display device. A controller of the electronic device is communicatively coupled to the at least one communication interface and a memory. In response to determining that the electronic device communicatively coupled to the first AR display, the controller monitors or checks for information that indicates, or correlates to, an age of the person wearing the first AR display device being below a threshold age. In response to receiving information indicating that the person wearing the first AR display device is below the threshold age, the controller activates an age-based customization, which can include an age restriction filter, on AR content provided by the electronic device. The controller selects and presents, at the first AR display device, an AR aged-based custom content selected/filtered version of the AR content, that is selected/filtered based on the age of the user.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 depicts a functional block diagram of an electronic device, specifically communication device 100, that provides AR notifications at one or more augmented reality (AR) display device(s) 101a-101e (collectively 101), within an operating environment in which several of the features of the present disclosure are advantageously implemented. Referring now to the specific component makeup and the associated functionality of communication device 100. Communication device 100 is communicatively coupled to at least one of AR display devices 101a-101e respectively by an interlinked connection, a peripheral (tethered) connection, a wireless connection, a cellular over-the-air connection, and networked connection.

Communication device 100 enables one or more of AR display device(s) 101a— 101e to provide a more intuitive and informative user interface for passive objects as well as for active objects such as Internet of things (IoT) devices 102a-102b (collectively 102). In addition, communication device 100 determines when a wearer of one of the AR display device(s) 101a— 101e is below one or more age thresholds, enabling or disabling AR age-based custom content selector/filter(s) 105 for AR content presented at the corresponding one of AR display device(s) 101a— 101e. In one or more embodiments, communication device 100 includes device memory 103, communication subsystem 104, data storage subsystem 106, and input/output (I/O) subsystem 108. Device memory 103 and each subsystem (104, 106, and 108) are managed by controller 110. Device memory 103 includes program code for applications, such as AR age-based custom content selector/filter(s) 105, AR application 111, object/face/voice (OFV) recognition application 112, and other application(s) 113. Device memory 103 further includes operating system (OS) 114, firmware interface 115, such as basic input/output system (BIOS) or Uniform Extensible Firmware Interface (UEFI), and firmware 116.

Controller 110 includes processor subsystem 117, which executes program code to provide operating functionality of communication device 100 that associates and communicates AR notification content tethered to active and passive objects within a field of view of AR display device(s) 101a-101e. The software and/or firmware modules have varying functionality when their corresponding program code is executed by processor subsystem 117 or secondary processing devices within communication device 100. Processor subsystem 117 of controller 110 can execute program code of AR application 111, OFV recognition application 112, and other application(s) 113 to configure communication device 100 to perform specific functions. In an example, AR application 111 enables and disables AR age-based custom content selector/filter(s) 105 that screens AR content. Device memory 103 can include data 118 used by the applications. In one or more embodiments, controller 110 executes AR application 111 to configure communication device 100 to receive image stream 119 from a particular one of AR display device(s) 101a-101e. AR application 111 maintains digital map 120 and image library 121 of passive and active objects. Digital map 120 may include three-dimensional locations of objects defined in geospatial coordinates or relative vector locations from interior references. Digital map 120 may include exterior topographical features and interior obstructions such as walls, ceilings, floors, doors, and furniture. Image library 121 includes one or more of visual representations and three-dimensional shape representations of objects. The representations may include dimensional data. Each representation may be tagged with identification data of a type of object or a specific object.

In one or more embodiments, digital map 120 and image library 121 are sent to communication device 100. In an example, communication device 100 downloads image library 121 from a network server and downloads digital map 120 from a home automation system that is linked to local active objects. In another example, communication device 100 generates or updates digital map 120 and image library 121. In an example, communication device 100 generates or updates digital map 120 using location data obtained from location services, such as by receiving signals from GPS satellites 170 or triangulating from base nodes 164. Objects identified in image streams 119 may be represented with identification and location in digital map 120. Still images extracted from image streams 119 may be added to image library 121. AR application 111 generates notification content 122 that is communicated to a particular one of AR display device(s) 101a-101e for presenting to person 123 who is wearing the particular one of AR display device(s) 101a-101e. In one or more embodiments, AR application 111 attempts to authenticate person 123 by accessing user records 124 that may contain identification information 125, user authentication credentials 126, and/or biometric information, such as a digital image 127.

I/O subsystem 108 includes user interface components such as vibration output device 128, light output device 129, image capturing device(s) 130, microphone 131, display device 132 that presents user interface 133, touch/haptic controls 134, and audio output device(s) 136. In an example, image capturing device(s) 130 are front and back cameras. In another example, image capturing device(s) 130 are on the same side but have different lenses such as two different ones of telephoto, wide angle, macro, or general-purpose lenses. I/O subsystem 108 also includes I/O controller 137. In one or more embodiments, image capturing device(s) 130 includes functionality of a range finding device such as a lidar, ultrasonic distance sensor, or infrared (IR) range finder. In one or more embodiments, multiple image capturing devices 130 can provide stereoscopic distance finding.

I/O controller 137 provides communication and power signals to functional components described herein as part of device memory 103, communication subsystem 104, data storage subsystem 106, or I/O subsystem 108. I/O controller 137 connects to internal devices 138, which are internal to housing 139. I/O controller 137 also connects to tethered peripheral devices such as AR display device 101e, which are external to housing 139 of communication device 100. Internal devices 138 include computing, storage, communication, or sensors, such as microphones 131 and image capturing devices 130, depicted within housing 139 and described above. I/O controller 137 supports the necessary configuration of connectors, electrical power, communication protocols, and data buffering to act as an interface between internal devices 138 and peripheral devices, such as AR display device 101e, and other components of communication device 100 that use a different configuration for inputs and outputs.

Communication device 100 may be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the communication components and features of communication device 100. Communication subsystem 104 of communication device 100 enables wireless communication with external communication system 148. Communication subsystem 104 includes antenna subsystem 150 having lower band antennas 151a-151m and higher band antenna arrays 152a-152n that can be attached in/at different portions of housing 139. Communication subsystem 104 includes radio frequency (RF) front end 153 and communication module 154. RF front end 153 includes transceiver(s) 155, which includes transmitter(s) 156 and receiver(s) 157. RF front end 153 further includes modem(s) 158. RF front end 153 includes antenna feed/source networks 159, antenna switch network 160, antenna impedance sensor(s) 161, and antenna matching network(s) 162. Communication module 154 of communication subsystem 104 includes baseband processor 163 that communicates with controller 110 and RF front end 153. Baseband processor 163 operates in a baseband frequency range to encode data for transmission and decode received data, according to a communication protocol. Modem(s) 158 modulate baseband encoded data from communication module 154 onto a carrier signal to provide a transmit signal that is amplified by transmitter(s) 156. Modem(s) 158 demodulates each signal received from external communication system 148 using by antenna subsystem 150. The received signal is amplified and filtered by receiver(s) 157, which demodulate received encoded data from a received carrier signal. Antenna feed/source networks 159 transmits or receives from particular portions of antenna subsystem 150 and can adjust a phase between particular portions of antenna subsystem 150. Antenna switch network 160 can connect particular combinations of antennas (151a-151m, 152a-152n) to transceiver(s) 155. Controller 110 can monitor changes in antenna impedance detected by antenna impedance sensor(s) 161 for determining portions of antenna subsystem 150 that are blocked. Antenna matching network(s) 162 are connected to particular lower band antennas 151a-151m to tune impedance respectively of lower band antennas 151a-151m to match impedance of transceiver(s) 155. Antenna matching network(s) 162 can also be used to detune the impedance of lower band antennas 151a-151m to not match the impedance of transceiver(s) 155 to electromagnetically isolate a particular antenna.

In one or more embodiments, controller 110, via communication subsystem 104, performs multiple types of over-the-air (OTA) communication with network nodes 164 of external communication system 148. Particular network nodes 164 can be part of communication networks 165 of public land mobile networks (PLMNs) that provide connections to plain old telephone systems (POTS) 166 for voice calls and wide area networks (WANs) 167 for data sessions. WANs 167 can include Internet and other data networks to communication device 100, AR display device 101c, and IoT device 102b. The particular network nodes 164 can be cellular "cells", base nodes, or base stations 168 that support cellular OTA communication using RAT as part of a radio access network (RAN). Unlike earlier generations of cellular services, where voice and data were handled using different RATs, both are now integrated with voice being considered one kind of data communication. Conventionally, broadband, packet-based transmission of text, digitized voice, video, and multimedia communication are provided using Fourth generation (4G) RAT of evolved UTMS radio access (E-UTRA), referred to a Long Term Evolved (LTE), although some cellular data service is still being provided by third generation (3G) Universal Mobile Telecommunications Service (UMTS). A fifth generation (5G) RAT, referred to as fifth generation new radio (5G NR), is being deployed to at least augment capabilities of 4G LTE with a yet higher capability of data transfer. Development continues for what will be six generation (6G) RATs and more advanced RATs. With wireless frequency spectrum seemingly ever expanding, additional antennas (151a-151m, 152a-152n) are incorporated to support newer radio access technologies (RATs) and multi band operation. Dual low band (2L) or quad low band (4L) multiple input multiple output (MIMO) operation dictates multiple antennas communicate on multiple bands simultaneously.

In one or more embodiments, network nodes 164 can be access node(s) 169 that support wireless OTA communication. Communication subsystem 104 can receive OTA communication from location services such as provided by global positioning system (GPS) satellites 170. Communication subsystem 104 communicates via OTA communication channel(s) 172a with base stations 168. Communication subsystem 104 communicates via wireless communication channel(s) 172b with access node(s) 169. In one or more particular embodiments, access node(s) 169 supports communication using one or more IEEE 802.11 wireless local area network (WLAN) protocols. Wi-Fi™ is a family of wireless network protocols, based on the IEEE 802.11 family of standards, which are commonly used between user devices and network devices that provide Internet access. In one or more particular embodiments, communication subsystem 104 communicates with one or more locally networked devices 173 via wired or wireless link 172c provided by access node(s) 169. Communication subsystem 104 receives GPS signal(s) 172d broadcast by GPS satellites 170 to obtain geospatial location information.

In one or more embodiments, controller 110, via communication subsystem 104, performs multiple types of OTA communication with local communication system 174. In one or more embodiments, local communication system 174 includes wireless headset 175 and smart watch 176 that are coupled to communication device 100 to form a personal access network (PAN). Communication subsystem 104 communicates via low power wireless communication channel(s) 172e with wireless headset 175. Communication subsystem 104 communicates via second low power wireless communication channel(s) 172f, such as Bluetooth, with smart watch 176 such as used by person 123. Communication subsystem 104 communicates via wireless mesh protocols via communication channel 172g to IoT device 102a. In an example, the mesh protocol is Zigbee, which is a short-range, low-power, wireless standard (IEEE 802.15.4). Communication subsystem 104 wireless communicates with AR display device 101b via communication channel(s) 172h using a protocol that supports image stream 119 and notification content 122.

Data storage subsystem 106 of communication device 100 includes data storage device(s) 179. Controller 110 is communicatively connected, via system interlink 180, to data storage device(s) 179. Data storage subsystem 106 provides applications, program code, and stored data on nonvolatile storage that is accessible by controller 110. For example, data storage subsystem 106 can provide a selection of applications and computer data such as AR application 111, OFV recognition application 112, and other application(s) 113 that support or enhance the functionality of AR display device(s) 101a-101e. These applications can be loaded into device memory 103 for execution by controller 110. In one or more embodiments, data storage device(s) 179 can include hard disk drives (HDDs), optical disk drives, and/or solid-state drives (SSDs), etc. Data storage subsystem 106 of communication device 100 can include removable storage device(s) (RSD(s)) 181, which is received in RSD interface 182. Controller 110 is communicatively connected to RSD 181, via system interlink 180 and RSD interface 182. In one or more embodiments, RSD 181 is a non-transitory computer program product or computer readable storage device. Controller 110 can access RSD 181 or data storage device(s) 179 to provision communication device 100 with program code, such as code for AR application 111, OFV recognition application 112, and other application(s) 113.

In one or more embodiments, I/O subsystem 108 includes network interface controller (NIC or "network interface") 185 with a network connection (NC) 186. Network cable 187 connects NC 186 to wired area network 188. NIC 185 can be referred to as a "network interface" that can support one or more network communication protocols. Wired area network 188 can be a local area network (LAN), a campus area network (CAN), a metropolitan area network (MAN), or a wide area network (WAN). For example, NC 186 can be an Ethernet connection. AR display device 101d is communicatively coupled to wired area network 188.

Controller 110 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 110 includes processor subsystem 117, which includes one or more central processing units (CPUs), depicted as data processor 189. Processor subsystem 117 can include one or more digital signal processors 190 that are integrated with data processor 189. Processor subsystem 117 can include other processors that are communicatively coupled to data processor 189, such as baseband processor 163 of communication module 154. In one or embodiments that are not depicted, controller 110 can further include distributed processing and control components that are external to housing 139 or grouped with other components, such as I/O subsystem 108. Data processor 189 is communicatively coupled, via system interlink 180, to device memory 103. In one or more embodiments, controller 110 of communication device 100 is communicatively coupled via system interlink 180 to communication subsystem 104, data storage subsystem 106, and I/O subsystem 108.

System interlink 180 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 180) are illustrated in FIG. 1, it is to be understood that more, fewer, or different interconnections may be present in other embodiments.

Within the description of the remaining figures, references to similar components presented in a previous figure are provided the same reference numbers across the different figures. Where the named component is presented with different features or functionality, a different reference numeral or a subscripted reference numeral is provided (e.g., 100a in place of 100).

Figure 2A:
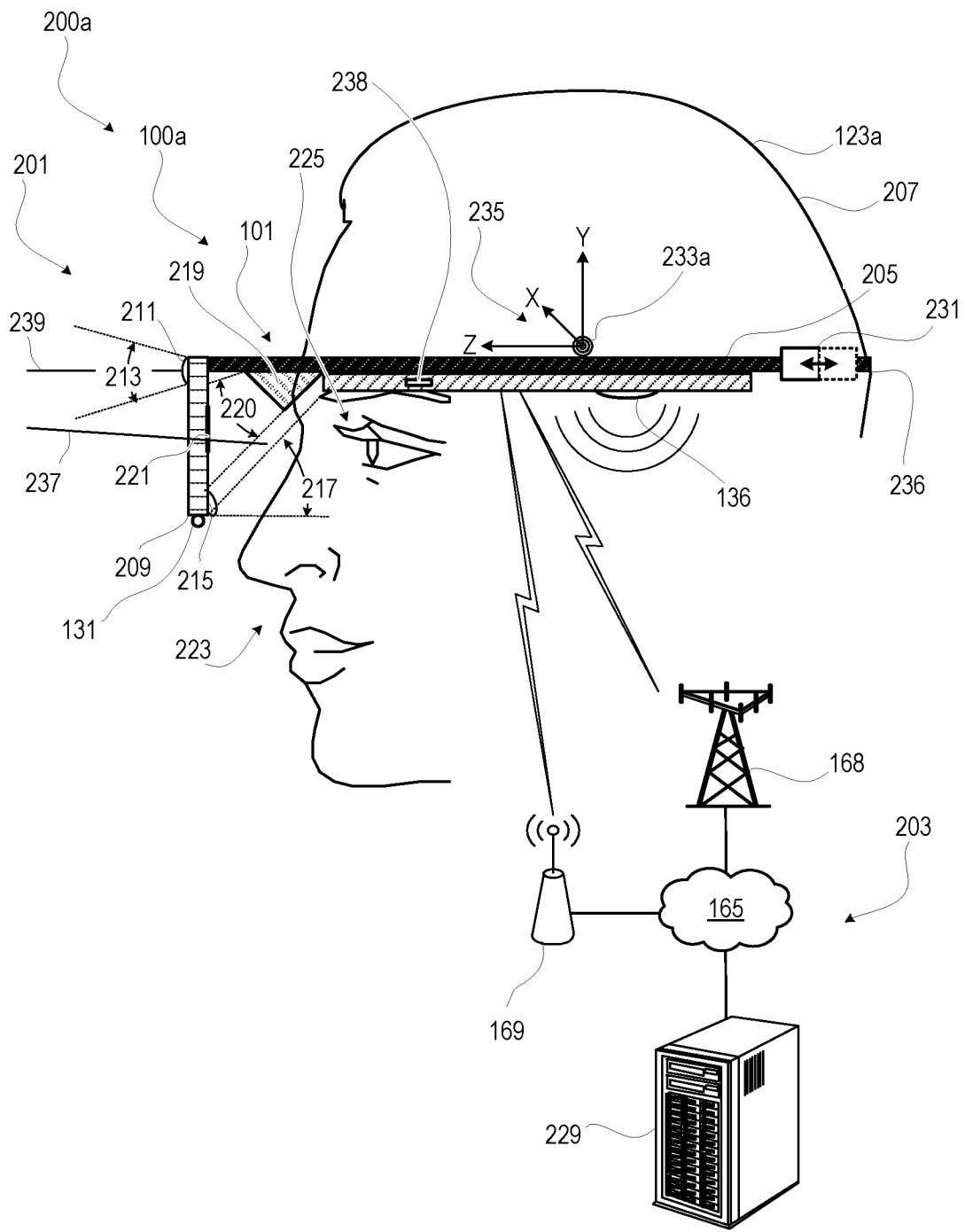
FIG. 2A depicts a first communication environment with an example communication device in communication with an AR display device assembly and in communication with a communication network, according to one or more embodiments.

FIG. 2A depicts first communication environment 200a with communication device 100a communicatively connected via an interlinked connection with AR display device 101a to provide AR display assembly 201. In one or more embodiments, communication device 101a may operate as a standalone device. In one or more embodiments, communication device 101a may operate in communication with communication network 203. Communication device 100a can be a miniaturized implementation of communication device 100 of FIG. 1 and may have similar or identical components. Communication device 100a includes components that are compatible with a form factor for an article that is to be worn, carried, or stowed in a clothing pocket by person 123. In an example, communication device 100a includes visor or eyeglasses frame 205 that is received on head 207 of person 123 and supports communication device 100a and AR display device 101a having optical components. These optical components include: (i) lenses 209; (ii) first camera 211 that is forward oriented with a first FOV 213; (iii) second camera 215 that is aft oriented with a second FOV 217; and (iv) AR projector 219 having a field of focus 220 to project AR imagery 221 on lenses 209. In one or more embodiments, lenses 209 include an electrochromatic material that darkens in response to a control signal. Communication device 100a may monitor an image stream from first camera 211 for an ambient light measurement. Communication device 100a may monitor an image stream from second camera 215 for imaging a portion of face 223 of person 123, such as for facial recognition or for detecting eye glance direction and eyelid position of eyes 225.

Communication device 101a supports one or more over-the-air (OTA) communication protocols. In another example, communication device 101a communicates using cellular protocol with base station 168 and communication network 165 to obtain AR notification content from network server 229. In an additional example, communication device 101a communicates via wireless protocol with access node(s) 169 and communication network 165 to obtain notification content from network server 229. Communication device 101a presents AR imagery 221 at AR display device 101a. Communication device 101a may operate standalone or may retrieve AR imagery 221. Network interface 185 communicatively connects communication device 100a to AR display device 101a to receive image stream from FOV 213 of AR display device 101a. Controller 110 (FIG. 1) identifies at least one object within the image stream, generates notification content associated with a particular object of the at least one object, and presents, at AR display device 101, the notification content visually tethered to the particular object. In one or more embodiments, communication device 100a supports "hands-free" audio presentation and communication services via audio output device 136 or wireless headset 175 (FIG. 1). According to aspects of the present disclosure, communication device 100c enables and assists person 123 to be more mobile. Person 123 can move and keep local objects within view while being provided AR notification content relevant to these local objects by AR display device 101b.

Communication device 100a may use one or more techniques to identify objects and locations within FOV 213 by identifying gaze direction 237 of AR display device 101a. Communication device 100a has integrated AR display device 101a that translate and rotate with head 207. Communication device 100a may determine where head location 233a and head orientation 235 are relative to an interior space or relative to geospatial coordinates. As a first approximation of gaze direction 237 by person 123, boresight 239 of first camera 211 within FOV 213 is oriented generally in line when eyes 225 are gazing straight ahead. As a second approximation of gaze direction 237, second camera 215 directly detects gaze direction 237 of eyes 225.

Communication device 100a may capture voice of person 123 via microphone 131 and utilizes characteristics of the capture voice to determine an age of the person. For example, communication device 100a may store voice data files that allows communication device 100a to compare captured voices to determine if the voice is one that is recognized and associated with specific person 123 whose age is known. AR display device 101a may capture an image of face 223 of person 123 and utilized the captured image to identify person 123, using one or more pre-stored images of known persons for whom the age of person 123 is known. When unable to identify or determine the age of person 123, controller 110 (FIG. 1) of communication device 100a may infer age of person 123 by analyzing new images captured by communication device 100a and AR display device 101a for information indicating, or correlated to, a size of person 123.

In one or more embodiments, AR display device 101a has embedded code 238 that can be read by communication device 100a to identify what model/style/size of AR display device 101a. In one or more embodiments, communication device 100a has a head adjustment latch or mechanism 231 that identifies a head size of the person wearing the AR display device. In one embodiment, the size of AR display device may vary between that of a child, an adolescent, and an adult, each size measurable or determinable by head adjustment latch or mechanism 231. In addition, a current head size of person wearing AR display device may be reported by head adjustment latch or mechanism 231 to communication device, enabling communication device to perform an age determination of person 123, at least in part in response to a current size setting of AR display device as measured and/or reported by head adjustment latch or mechanism 231. In an example, head adjustment latch or mechanism 231 has an optical reader that reads a linearly encoded scale on an adjustment strap 236 of AR display device 101a to determine a head size.

In one or more embodiments, communication device 100a monitors available image streams from image capturing devices of communication device 100a and AR display device 101a. Communication device 100a collects images that indicate a linear height above ground of AR display device 101a while worn by person 123. Communication device 100a collects images of the wearer of AR display device 101a that indicate a body size of the wearer (person 123). Communication device 100a determining whether the collected images definitively establish that the wearer of AR display device 101a is at least a size associated with an age that is equal to or greater than the threshold age ("adult height threshold"). In response to determining the collected images definitively establish that the wearer (person 123) of AR display device 101a is at least a size associated with age that is equal to or greater than the threshold age, communication device 100a assigns an estimated age to person 123 that is greater than the threshold age. Otherwise, communication device 100a assigns an estimated age that is less than the threshold age.

Figure 2B:
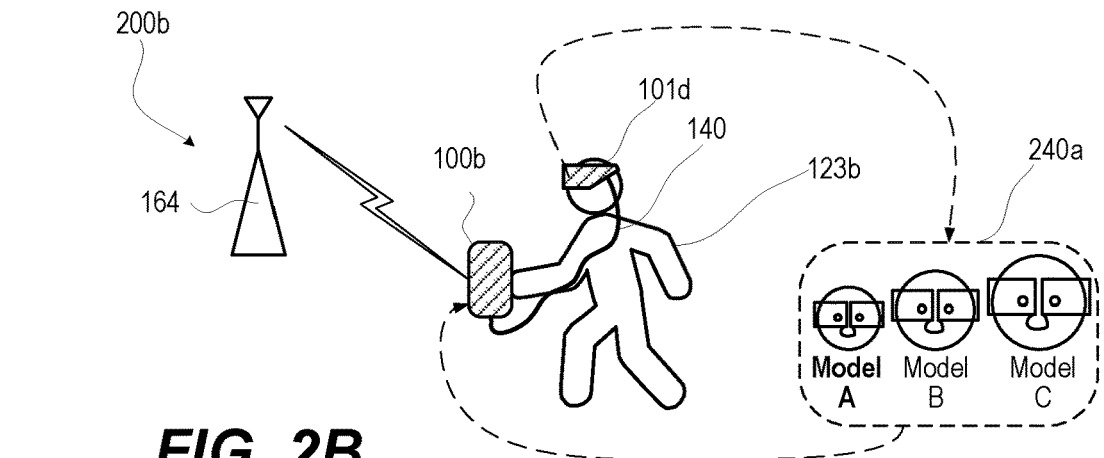
FIG. 2B depicts a second communication environment with a communication device communicatively coupled with a tethered connection to the AR display device, according to one or more embodiments.

FIG. 2B depicts second communication environment 200b with communication device 100b communicatively coupled and tethered by electrical cable 140 to AR display device 101d. Communication device 100b connects to network node 164 for notification content and communication services. Communication device 100b is an implementation of communication device 100 of FIG. 1 and may have similar or identical components. Communication device 100b includes components that are compatible with a form factor for an article that is to be worn, carried, or stowed in a clothing pocket by person 123. In one embodiment, the form factor can be determinative of or used in determining whether the person 123 is an adult or a child. Communication device 100b provides additional user interface features, communication capabilities, additional stored battery power, and content presentation features to AR display device 101d. In one or more embodiments, AR display device 101b is a particular model of more than one model of AR display device 101 (FIG. 1). In an example, person 123b is a child and the specific model of AR display device 101, e.g., "Model A", is sized for a child. AR display device 101a has embedded code 238 (FIG. 2A) that can be read by communication device 100a as configuration information 240a to identify Model A of AR display device 101a. Configuration information 240a enables an age determination based at least in part on the model type or model number of AR display device 101b, which correlates to a specific age or age category.

Figure 2C:
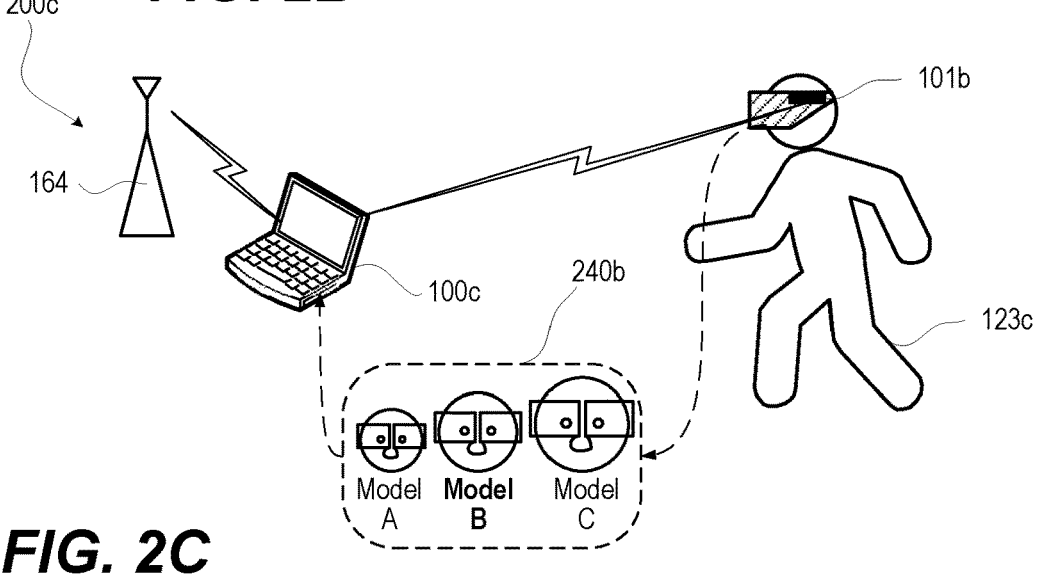
FIG. 2C depicts a third communication environment with a communication device communicatively coupled via a wireless connection to the AR display device, according to one or more embodiments.

FIG. 2C depicts third communication environment 200c with communication device 100c communicatively coupled wirelessly to AR display device 101b. Communication device 100c connects to network node 164 for notification content and communication services. Communication device 100c is an implementation of communication device 100 of FIG. 1 and may have similar or identical components. Communication device 100c includes components that are compatible with a form factor for fixed, portable, or mobile hand-carried implementations. In one or more embodiments, AR display device 101c is a particular model of more than one model of AR display device 101 (FIG. 1). In an example, person 123c is an adolescent and "Model B" is sized for an adolescent. AR display device has embedded code 238 (FIG. 2A) that can be read by communication device 100c as configuration information 240b to identify Model B of AR display device 101b. Configuration information 240b enables an age determination based at least in part on the model type or model number of AR display device 101c, which correlates to a specific age or age category.

Figure 2D:
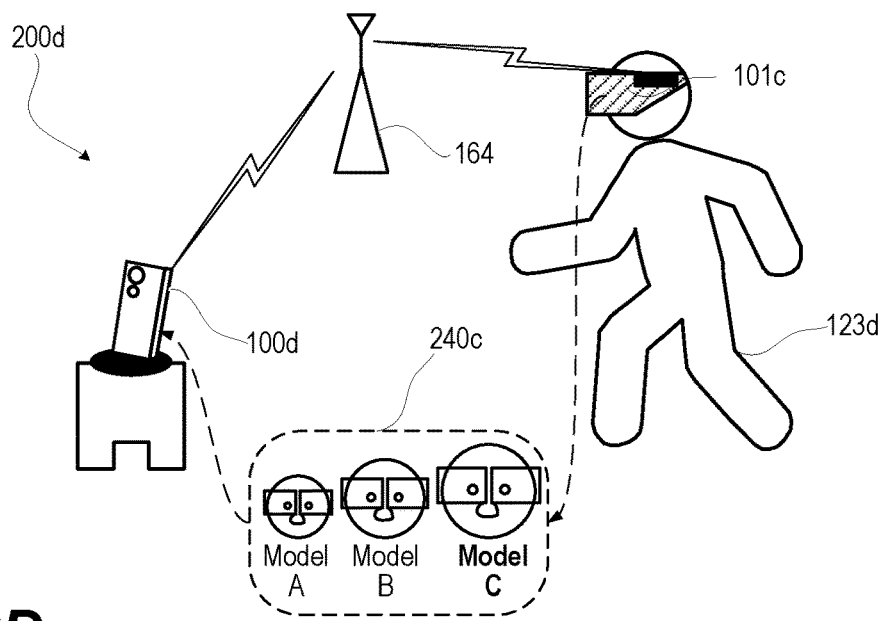
FIG. 2D depicts a fourth communication environment with a communication device communicatively coupled via a cellular over-the-air connection to the AR display device, according to one or more embodiments.

FIG. 2D depicts fourth communication environment 200d with communication device 100d communicatively coupled over-the-air to via one or more network nodes 164 to AR display device 101c. Communication device 100c connects to network node 164 for notification content and communication services. The communication services include connecting to AR display device 101c. Communication device 100d is an implementation of communication device 100 of FIG. 1 and may have similar or identical components. Communication device 100d includes components that are compatible with a form factor for fixed, portable, or mobile hand-carried implementations. In one or more embodiments, AR display device 101d is a particular model of more than one model of AR display device 101 (FIG. 1). In an example, person 123d is an adult and "Model C" is selected for being sized for an adult. AR display device 101d has embedded code 238 (FIG. 2A) that can be read by communication device 100d as configuration information 240c to identify Model C of AR display device 101d. Configuration information 240c enables an age determination based at least in part on the model type or model number of AR display device 101d, which correlates to a specific age or age category.

Figure 3A:
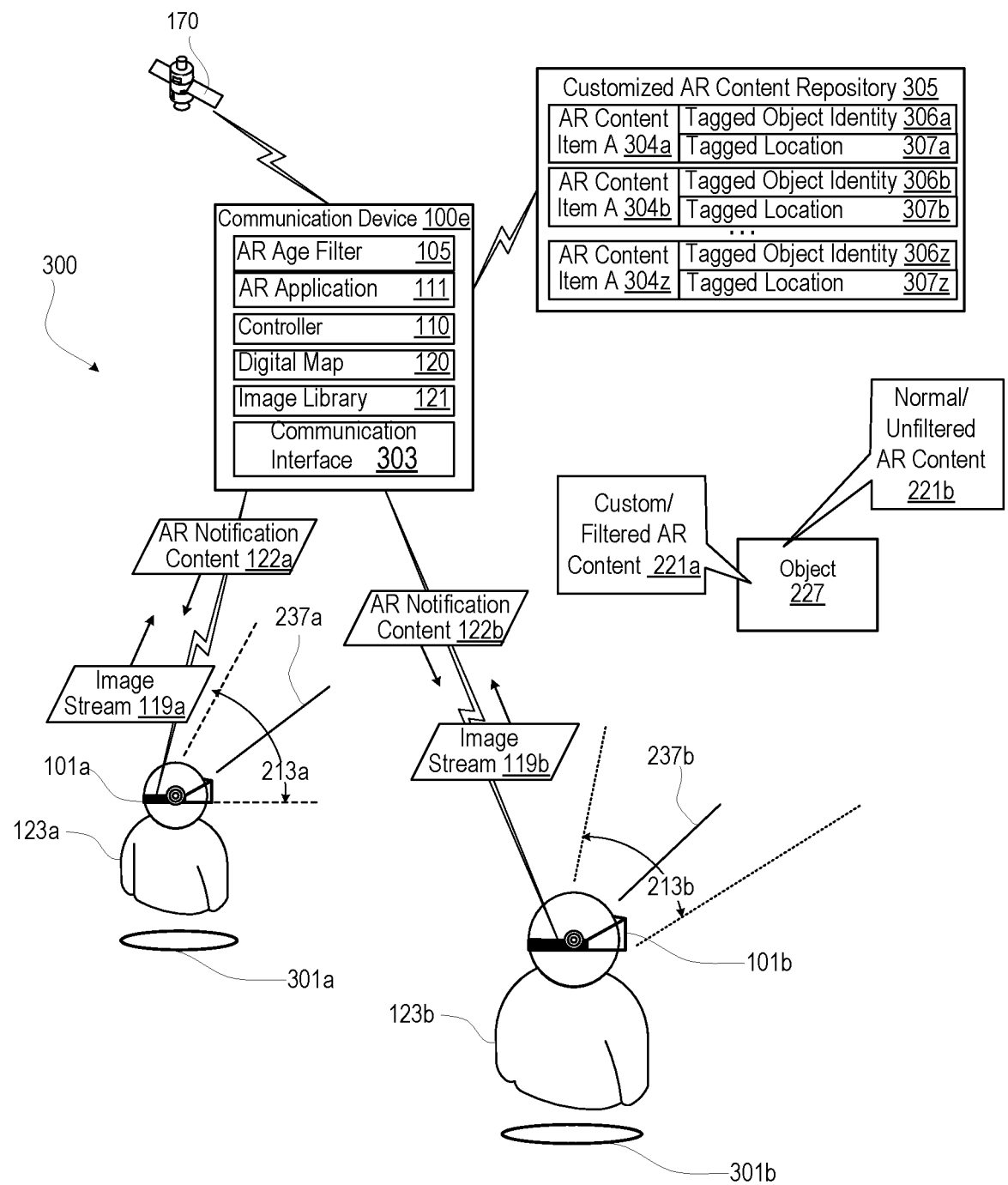
FIG. 3A depicts a fifth communication environment with the communication device providing custom content selected/filtered and normal content selected/unfiltered AR notification content respectively to two AR display devices, based on determined ages of the respective users, according to one or more embodiments.

FIG. 3A depicts fifth communication environment 300 with communication device 100e that sequentially provides custom selected/filtered or normal selected/unfiltered AR notification content 122a-122b to respective AR display devices 101a-101b. AR notification content 122a-122b appears as custom selected/filtered AR content 221a and normal selected/unfiltered AR content 221b visually tethered respectively to object 227. Communication device 100e is an implementation of communication device 100 of FIG. 1 and may have similar or identical components. Communication device 100e includes components that are compatible with a form factor for fixed, portable, or mobile hand-carried implementations. AR display device 101a, worn by first person 123a, is at location 301a and has FOV 213a about gaze direction 237a that encompasses object 227. Communication interface 303 of communication device 100e communicatively connects communication device 100e to AR display device 101a. Communication interface 303 provides one of interlinked, wired (tethered), networked, or wireless connection to AR display device 101a. Controller 110 of communication device 100 receives image stream 119a from AR display device 101a. Controller 110 identifies objects within image stream 119a, including object 227. Similarly, AR display device 101b, worn by second person 123b, is at location 301b and has FOV 213b about gaze direction 237b that encompasses object 227. Controller 110 of communication device 100 receives image stream 119b from AR display device 101b. Controller 110 identifies objects within image stream 119b, including object 227. To identify object 227, controller 110 can perform object recognition and identification using image library 121 (FIG. 1), determine a location of object 227 that corresponds to digital map 120 (FIG. 1) of objects, or receive a user designation from AR display device 101 that identifies the object.

Communication device 100e retrieves customized AR content items 304a-304z from customized AR content repository 305 hosted by network server 223019 (FIG. 2A). In one or more embodiments, communication device 100a may locally store customized AR content items 304a-304z, digital map 120, and image library 121 to operate standalone if selecting and presenting customized AR content items 304a-304z. Each customized AR content item 304a-304z may be associated ("tagged") with one or more of particular identity of an object index 306a-306z, such as an association with characteristic signage containing a tradename of a particular retail business. Each customized AR content item 304a-304z may be associated ("tagged") with one or more geospatial locations 307a-307z. Objects identified within FOV 213a-213b are associated with a geospatial location, such as by referencing GPS satellites 170. Communication device 100e identifies the object. Communication device 100e associates AR content related to the identity and/or location of the object. Communication device 100a can further customize, filter, and/or select a particular customized AR content item 304a-304z that is associated or tagged for a particular age classification, preference, or demographic of person 123.

Controller 110 executes AR application 111 that determines the age of person 123a and enables AR age-based custom content selector/filter 105 as required. In response to controller 110 determining that person 123a is below a threshold age, customized/filtered AR notification content 122a is selected for and displayed at first AR display device 101a. The custom selected/filtered AR notification content 122a may be a subset of normal selected/unfiltered AR notification content 122b or may be a completely different content that is generated specially for users under the threshold age. Person 123b is wearing second AR display device 101b, which can be a different AR display device or the same one that has been relinquished by person 123a. In response to controller 110 determining that person 123b is not below a threshold age, unfiltered ("normal") AR notification content 122b is selected and displayed at second AR display device 101b.

In one or more embodiments, both normal content for persons above the threshold age, e.g., adults and customized content for persons under the threshold age, e.g., children, are provided at the content source and available to be selected by controller for presenting at AR display device. The customized content can be completely different from the normal content. Alternatively, or in one or more embodiments, that customized content is a filtered version of the normal content. In this embodiment, an age filtering service pre-processes normal content to provide customized/filtered AR content in addition to the normal/unfiltered AR content, and each content type is individually selectable and retrievable by controller 110 to present on AR display device. In yet another embodiment, normal/unfiltered AR content is available as a default to display to all users. When age customization feature is activated on AR display device, controller 110 implements AR age-based custom selector/filter(s) 105 in real time to screen unfiltered AR content as required to generate age filtered, customized content when controller 110 detects the user of the AR glasses is below the threshold age. In one embodiment, the AR age-based custom content selector/filter 105 enables controller 110 to perform age-based custom content selecting/filtering by parsing the normal/unfiltered AR content to remove certain portions of the content that is tagged or otherwise identified as not appropriate for users below the threshold age. While the descriptions provide that the customization occurs from normal content to content customized for persons below a threshold age, the disclosure equally applies to presenting content for younger age group as the default normal content and customizing the content for an older age group (i.e., above the threshold age). Multiple different thresholds of age groups can also be supported, with each threshold range (e.g., below 12 years; 12-18 years; above 18 years) having a different customized content that is presented for the users within the threshold range.

Figure 3B:
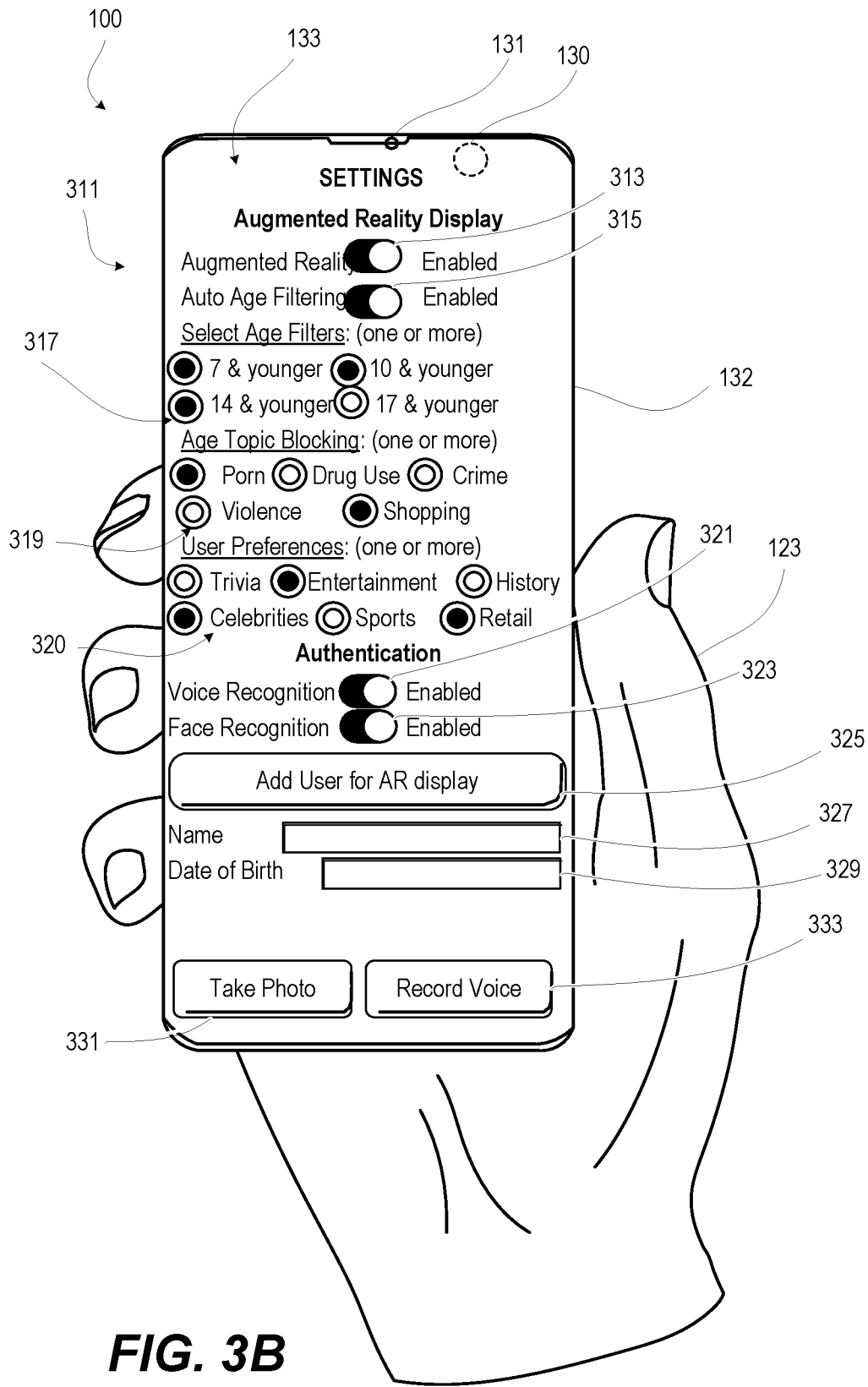
FIG. 3B depicts a front view of the display of the communication device presenting a setting user interface for AR display devices, according to one or more embodiments.

FIG. 3B depicts a front view of display device 132 of communication device 100 presenting user interface 133 by which fully authorized user 123 of communication device 100 is able to make/select/input user settings 311 for AR display devices 100a-100e (FIG. 1). Settings 311 include augmented reality functionality control 313 that manually toggles between enabling and disabling presentation of AR content at AR display devices 100a-100e (FIG. 1). Settings 311 include automatic age custom content selecting/filtering control 315 that toggles between enabled and disabled. Settings 311 include age custom content selecting/filtering select radio buttons 317, such as for: "7 and younger", "10 and younger", "14 and younger"; and "17 and younger". Age custom content selecting/filtering select radio buttons 317 enables selection of specific content from among multiple different pre-stored content to display to the user of the AR display device. For more advanced content selecting/filtering functions, settings 311 include age topic blocking radio buttons 319, such as "Porn", "Drug Use", "Crime", "Violence", and "Shopping". Topic blocking radio buttons 319 can be provided as advanced custom content selecting/filtering features where content selecting/filtering is being performed by controller 110 on normal/unfiltered content to generate age-appropriate displayed content, based on the identified age of the user. This feature is particularly useful for situations where no customized content exists for the specific age group of the user (e.g., when walking past establishment such as a lingerie store with advertising solely intended for adults). Settings 311 include user preferences radio buttons 320 that enable further customization of AR content selection and presentation. In an example, user preferences radio buttons 320 include "Trivia", "Entertainment", "History", "Celebrities", "Sports", and "Retail". Available AR content that includes multiple options for a series of object or locations within the FOV of customer device 100 may be customized/selected at least in part in response to selected user preferences in addition to the age of the person.

In one or more embodiments, age filtering performed by communication device 100 acts as a screening mechanism to prevent presenting AR content that is deemed not appropriate for a defined one or more age categories. Communication device 100 may also perform other age-based custom content selecting/filtering functions for content presented on other output devices such as display device 132 (FIG. 1).

Settings 311 include authentication voice recognition control 321 that toggles between enabled and disabled. In an example, communication device 100 uses microphone 131 to obtain a voice sample that is then used to later authenticate the device user via detected speech. Settings 311 include authentication face recognition control 323 that toggles between enabled and disabled. In an example, communication device 100 uses image capturing device 130 to capture a facial image that can then be used to later authenticate the device user whose face is detected by image sensor of AR display device 101a or communication device 100. Settings 311 include add user control 325 that enables entering a name of a new user in name field 327 with associated date of birth (DOB) for the new user in DOB field 329 to use AR display devices 100a-100e (FIG. 1). Automatic age custom content selecting/filtering can be responsive to the DOB field 329. During initial setup, the fully authorized user 123 of communication device 100 may select "take photo control" 331 and/or "record voice control" 333 to obtain biometric information for a new user such as a child.

Figure 3C:
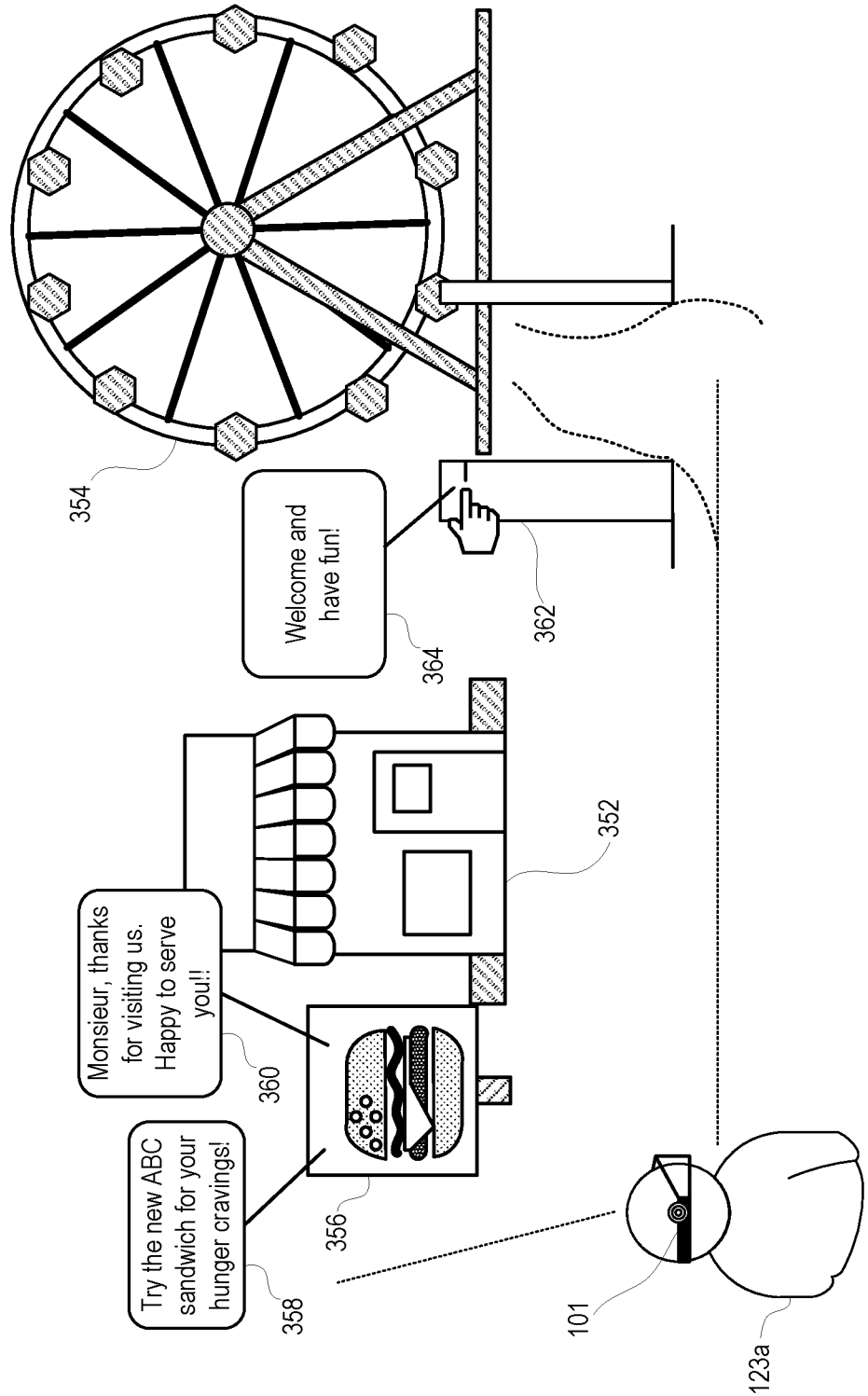
FIG. 3C depicts an AR display device being worn by a person who views natural imagery with AR imagery customized for an age of the person that is at or above an age threshold, according to one or more embodiments.

FIG. 3C depicts AR display device 101 being worn by person 123a who views natural imagery with AR imagery customized for an age of the person that is at or above an age threshold. Person 123a is at a location such as a bus stop looking down a street. Through AR display device 101, person 123a sees businesses and attractions, such as restaurant 352 and amusement ride 354, rendered into a three-dimensional, highly-interactive commercial for options tailored to the age and identified or provided preferences of person 123a. Entertainment may be included, such as presenting jokes, trivia facts about particular locations, and decorative annotations such as virtual fireworks. In an example, natural billboard 356 beside restaurant 352 may be annotated with additional AR imagery, such as customized billboard AR notice 358 when approaching "Try the new ABC sandwich for your hunger cravings!" Customized billboard AR notice 360 may be presented when departing "Monsieur, thanks for visiting us. Happy to serve you!" Similarly, when person 123a approaches entrance 362 to amusement ride 354, AR display device 101 determines that person 123a is old and tall enough and presents AR notice 364: "Welcome and have fun!"

Figure 3D:
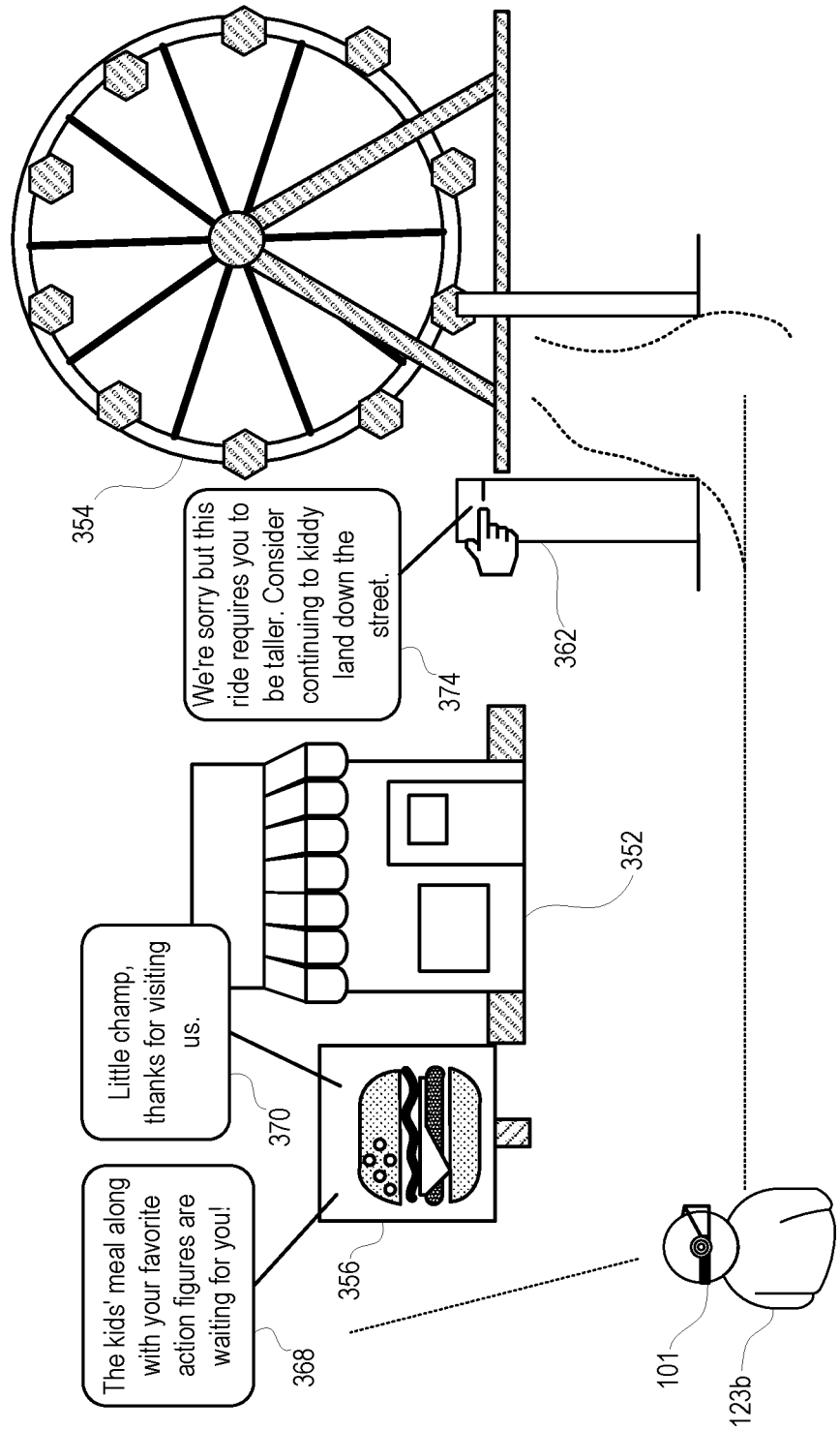
FIG. 3D depicts an AR display device being worn by a person who views natural imagery with AR imagery customized for an age of the person that is below the age threshold, according to one or more embodiments.

FIG. 3D depicts AR display device 101 being worn by person 123b who views natural imagery with AR imagery customized for an age of the person that is below the age threshold. Person 123b is at the same location such as the bus stop looking down the street. Through AR display device 101, person 123b sees businesses and attractions, such as restaurant 352 and amusement ride 354, rendered into a three-dimensional, highly-interactive commercial for options tailored to the age and identified or determined preferences of person 123b. Entertainment may be included, such as presenting jokes, trivia facts about particular locations, and decorative annotations such as virtual fireworks that are age appropriate. In an example, trivia about youthful celebrities about the age of person 123b may be presented rather than about older adult celebrities. In another example, natural billboard 356 beside restaurant 352 may be annotated with additional AR imagery, such as customized billboard AR entry 368 when approaching: "The kids' meal along with your favorite action figures are waiting for you!" Customized billboard AR entry 370 may be presented when departing: "Little champ, thanks for visiting us. Looking forward for your visit again!" Similarly, when person 123b approaches entrance 362 to amusement ride 354, AR display device 101 determines that person 123b is too young or not tall enough and presents AR notice 374: "We're sorry but this ride requires you to be taller. Consider continuing to kiddy land down the street."

Figure 4A:
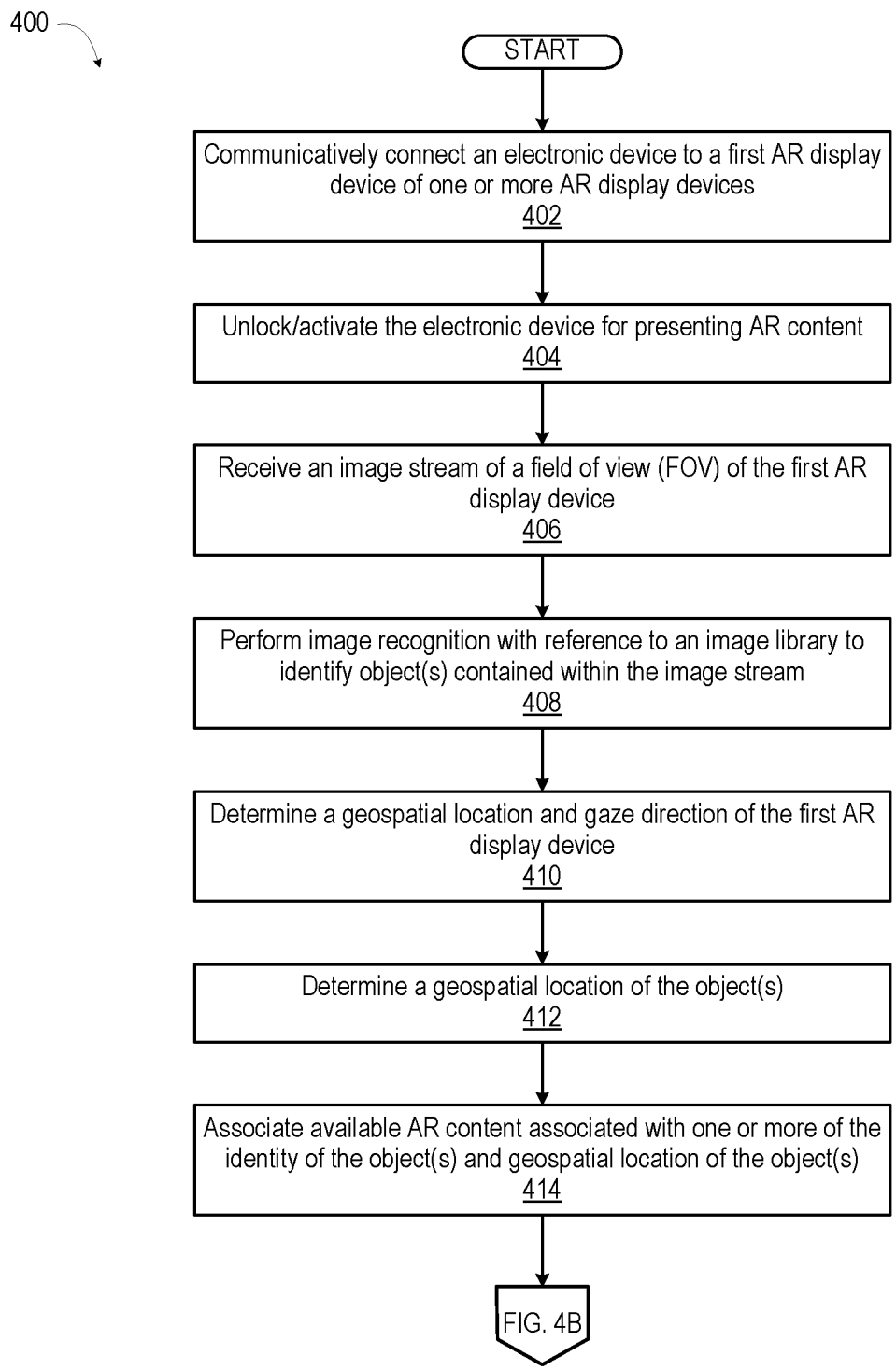
FIG. 4A-4B (collectively FIG. 4) present a flow diagram of a method performed by an electronic device for automatic age determination of a person wearing an AR display device to trigger age-appropriate AR custom content selecting/filtering, according to one or more embodiments.
Figure 4B:
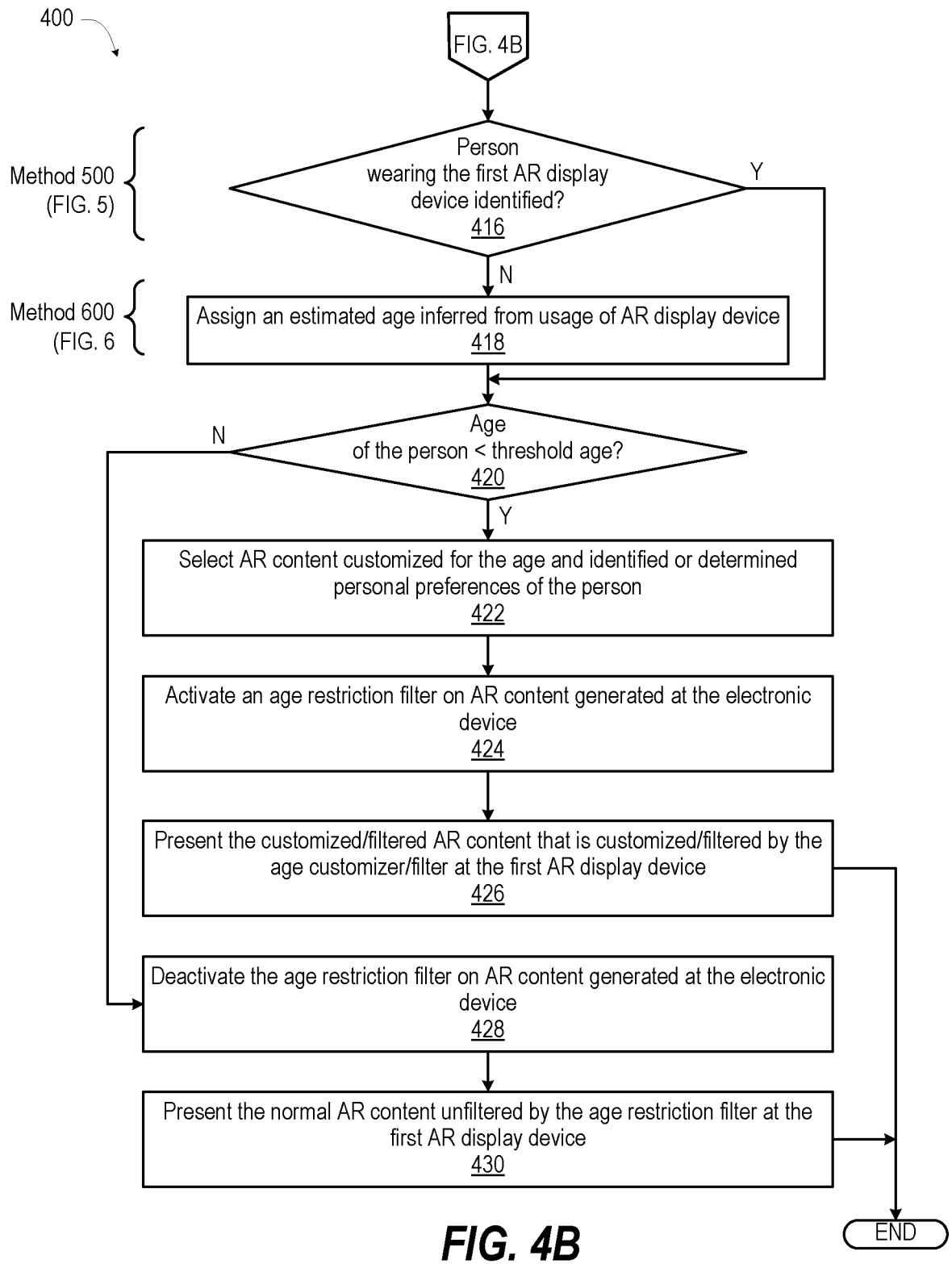
Figure 5:
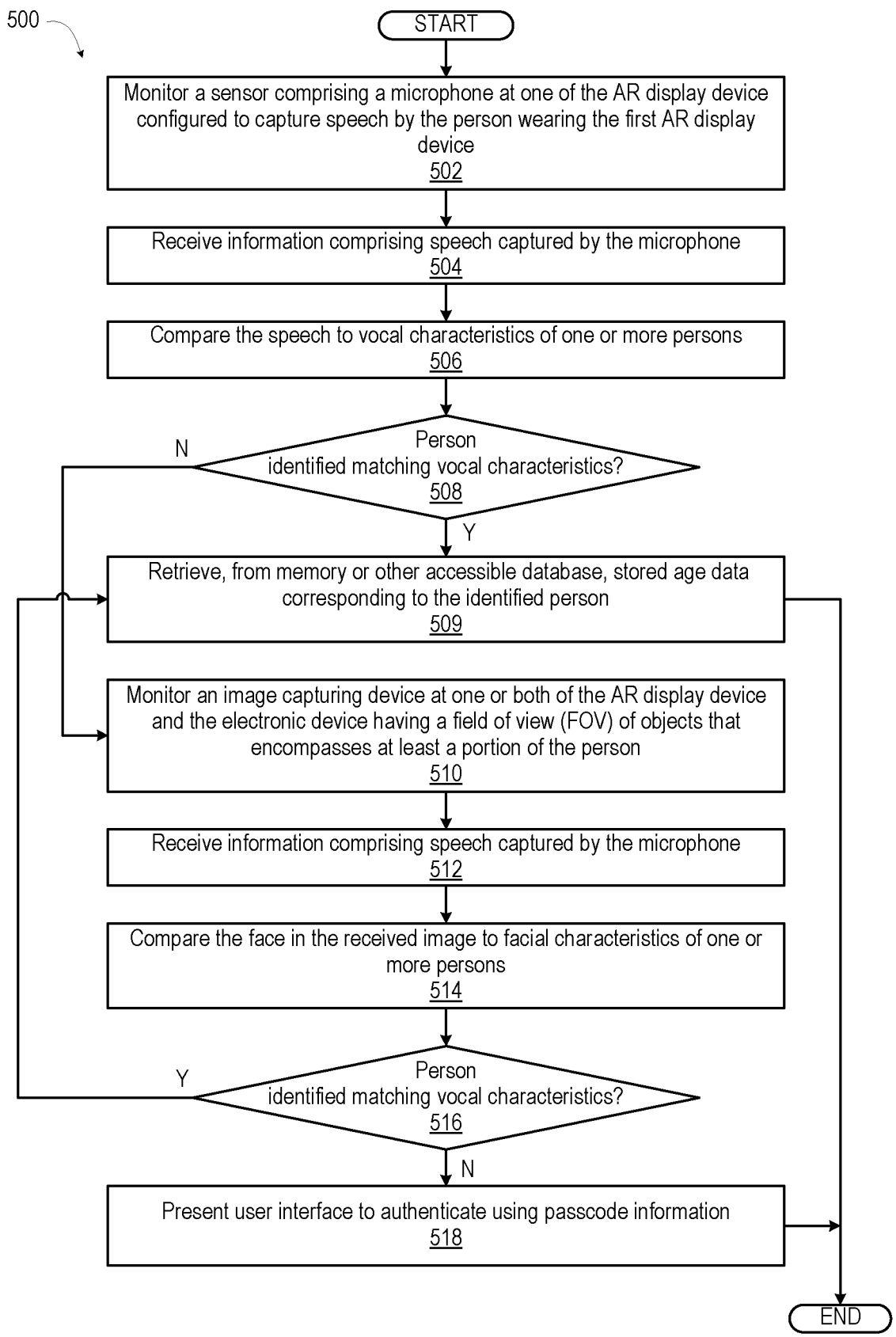
FIG. 5 presents a flow diagram of a method performed by an electronic device for identifying the wearer of the AR display device to determine a corresponding age of the user/wearer, according to one or more embodiments.
Figure 6:
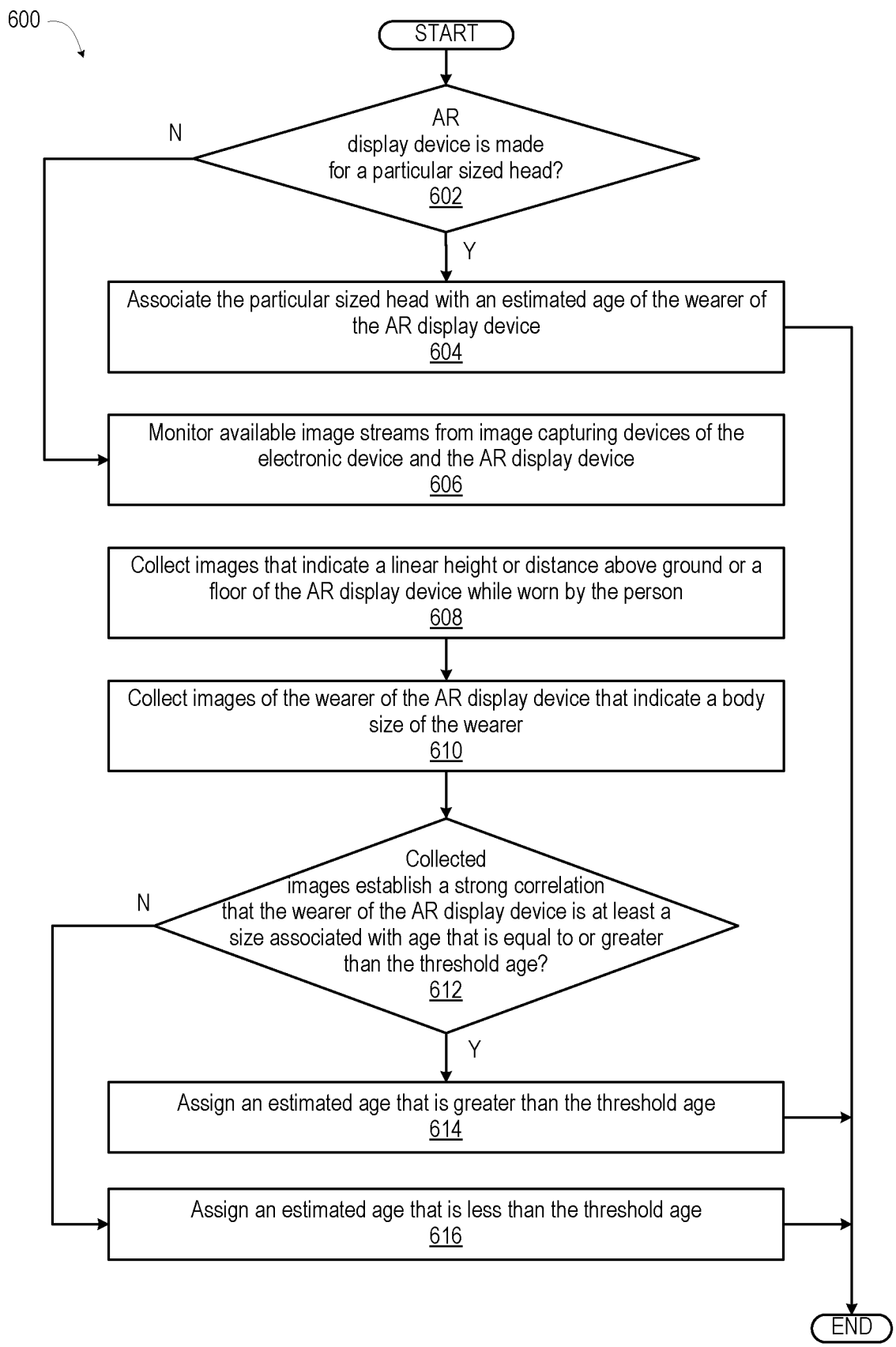
FIG. 6 presents a flow diagram of a method performed by an electronic device for estimating the age of an unidentified/unregistered wearer of the AR display device, according to one or more embodiments.

FIG. 4A-4B (collectively FIG. 4) present a flow diagram of method 400 performed by an electronic device for automatic age determination of a person wearing an AR display device to trigger age-appropriate AR custom content selecting/filtering. FIG. 5 presents a flow diagram of method 500 performed by an electronic device for identifying the wearer of the AR display device to determine a corresponding age of the user. FIG. 6 presents a flow diagram of method 600 performed by an electronic device for estimating the age of an unidentified wearer of the AR display device. The description of methods 400, 500, and 600 are provided with general reference to the specific components illustrated within the preceding FIGS. 1, 2A-2D, and 3A-3B, and specific components referenced in methods 400, 500, and 600 may be identical or similar to components of the same name used in describing preceding FIGS. 1, 2A-2D, and 3A-3B. In one or more embodiments, controller 110 configures communication device 100 (FIG. 1) to provide functionality of method 400 while communication device 100 is communicatively connected to AR display device 101 (FIG. 1) to present AR notifications and/or content.

With reference to FIG. 4A, method 400 includes communicatively connecting an electronic device to a first AR display device of one or more AR display devices (block 402). Method 400 includes unlocking and/or activating the electronic device to enable generating of AR content (block 404). Method 400 includes receiving an image stream of a field of view (FOV) of the first AR display device (block 406). Method 400 includes performing image recognition with reference to an image library to identify object(s) contained within the image stream (block 408). Method 400 includes determining a geospatial location and gaze direction of the first AR display device (block 410). Method 400 includes determining a geospatial location of the object(s) (block 412). Method 400 includes associating available AR content associated with one or more of the identity of the object(s) and geospatial location of the object(s) (block 414). Method 400 proceeds to block 416 (FIG. 4B).

With reference to FIG. 4B, method 400 includes determining whether the person wearing the first AR display device is identified (decision block 416). Examples of identifying the person are provided below in method 500 (FIG. 5). In response to determining that the person wearing the first AR display device is not identified, method 400 includes assigning an estimated age inferred from usage of the first AR display device (block 418). Examples of assigning an estimate age inferred from usage of the first AR display device are provided in method 600 (FIG. 6). In response to determining that the person wearing the first AR display device is identified in decision block 416 or after block 418, method 400 includes determining whether the information indicates that the age of the person is below a threshold age (decision block 420). In one or more embodiments, the age threshold is a graduated plurality of age thresholds with different customized content and/or progressively more restrictive custom content selecting/filtering applicable to younger age thresholds. In response to determining that the information indicates that the age of the person is below the threshold age, method 400 includes selecting AR content customized for the age and identified or determined personal preferences of the person, assuming the customized content is available (block 422). Alternatively, or in addition (e.g., if customized AR content is not available), method 400 can include activating an age-based custom content selector/filter on normal AR content generated at the electronic device for presentation on the first AR display device (block 424). Method 400 includes presenting the custom content selected/filtered AR content that is custom content selected/filtered by the age-based custom content selector/filter at the first AR display device (block 426). Then method 400 ends.

In response to determining that the information indicates that the age of the person is not below the threshold age, method 400 optionally includes deactivating the age-based custom content selector/filter on AR content generated at the electronic device, if the selector/filter was previously activated (block 428). Method 400 includes presenting the normal AR content, unfiltered by the age-based custom content selector/filter, at the first AR display device (block 430). Then method 400 ends.

With reference to FIG. 5, method 500 presents a series of processes for identifying the person wearing the first AR display device in order to determine the age of the person. Method 500 includes identifying the wearer of the AR display device based on user authentication performed at the communication device or AR display device to activate the device. In one embodiment, each user has a profile that includes the user's age or date of birth or secondary data that indicates the user's age. The authentication of the user's age in method 500 can involve a process of checking profile data of other information stored within memory of one or both of the electronic device and the AR display device for information indicative of or corresponding to the age of the person wearing the AR display device. It is appreciated that in some embodiments, the age of the user can also be associated with the application being used on the communication device. For example, a parent device may be used to stream content to a child or provide a specific application that is used by the child. Method 500 can then include identifying that the current user of the electronic device is the child, who has obtained parent authenticated access to the parent's device to use the child application or access the child content. Method 500 then includes AR-based custom content selecting/filtering of the normal AR display content to be appropriate for the child versus the adult who authenticated the device. When the age off the user is not determinable based on the authentication of the user to access the device or the application being used by the user, method 500 includes monitoring an audio sensor, e.g., a microphone, at one or both of the electronic device and/or first AR display device, which is configured to capture speech by the person wearing the first AR display device (block 502). Method 500 includes receiving information comprising speech captured by the microphone (block 504). Method 500 includes comparing the speech to stored or retrieved vocal characteristics of one or more persons (block 506). Method 500 includes determining whether the person wearing the AR display device is identified based on matching vocal characteristics of a particular person of the one or more persons (decision block 508). In response to identifying the person by matching the vocal characteristics, method 500 includes retrieving, from memory or other accessible database, stored age data corresponding to the identified person (block 509). Then method 500 ends.

In response to determining that the person is not identified by matching the vocal characteristics, method 500 includes monitoring an image capturing device at one or both of the AR display device and the electronic device having a field of view (FOV) of at least a portion of the face of the person (block 510). Method 500 includes receiving the information, captured by the image capturing device, related to the face of the person (block 512). Method 500 includes comparing the face in the received image to facial characteristics of one or more pre-identified persons (block 514). Method 500 includes determining whether the person wearing the first AR display device is identified based on matching facial characteristics of a particular one of the one or more pre-identified persons (decision block 516). In response to determining that the person is identified by matching the facial characteristics, method 500 returns to block 509. In response to determining that the person is not identified by matching the facial characteristics, method 500 includes presenting a user interface to receive the user's date or birth or age input or a content authorization passcode to receive normal AR content without the age-threshold restriction (block 518). Then method 500 ends.

With reference to FIG. 6, method 600 includes determining whether the AR display device is made for a particular sized head (decision block 602). In an example, the controller of the electronic device receives information comprising configuration information of the first AR display device that indicates that a size of the first display device. The controller determines that the person wearing the first AR display device is not an adult based on the size of the first display device correlating to the person not being an adult. In response to determining that the AR display device is made for a particular sized head, method 600 includes associating the particular sized head with an estimated age of the wearer of the AR display device (block 604). Then method 600 ends. In one or more embodiments, one model of an AR display device is automatically or manually adjustable/configurable to fit on a different size of head that corresponds to a particular estimated age.

In response to determining that the AR display device is not made for a particular sized head, method 600 includes monitoring available image streams from image capturing devices of the electronic device and the AR display device (block 606). Method 600 includes collecting images that indicate a linear height or distance above ground or a floor of the AR display device while worn by the person (block 608). Method 600 includes collecting images of the wearer of the AR display device that indicate a body size of the wearer (block 610). In an example, a third image capturing device and a range finding sensor at the electronic device have a FOV of at least a portion of the person wearing the first AR display device. The controller of the electronic device receives information comprises one or more image dimensions of the person imaged by the third image capturing device at distance detected by the range finding sensor. The controller calculates height and size related information of one of a height and size based on the one or more image dimensions at the distance. The controller determines that the person wearing the first AR display device is not an adult based on the at least one of the height and size correlating to the person not being an adult Method 600 includes determining whether the collected images establish a strong correlation that the wearer of the AR display device is at least a size associated with an age that is equal to or greater than the threshold age (decision block 612). In an example, the controller receives information, from the second image capturing device, related to one or more facial dimensions of the person. The controller determines that the person wearing the first AR display device is not an adult based on the one or more facial dimension correlating to the person not being adult. In response to determining the collected images establish that the wearer of the AR display device is at least a size associated with an age that is equal to or greater than the threshold age, method 600 includes assigning the user an estimated age that is greater than the threshold age (block 614). Then method 600 ends. In response to determining the collected images do not establish that the wearer of the AR display device is at least a size associated with age that is equal to or greater than the threshold age, method 600 includes assigning the user an estimated age that is less than the threshold age (block 616). Then method 600 ends.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
   at least one communication interface that communicatively connects the electronic device to one or more augmented reality (AR) display devices including a first AR display device; and
   a controller communicatively coupled to the at least one communication interface and memory, and which:
      in response to determining that the electronic device is communicatively coupled to the first AR display:
         monitors or checks for information that indicates, or correlates to, an age of a person wearing the first AR display device being below a threshold age;
      in response to receiving information indicating that the person wearing the first AR display device is below the threshold age, selects customized AR content customized for the person based on the age of the person and any identified personal preferences of the person; and
         presents, at the first AR display device, the customized AR content, customized based on the age of the person.

2. The electronic device of claim 1, wherein to select and present the customized AR content, the controller:
   identifies an object within a field of view (FOV) of the first AR display device;
   identifies a geospatial location of the object; and
   selects and presents the customized AR content that is associated with one or more of an identity of the object and the geospatial location of the object.

3. The electronic device of claim 1, further comprising:
   a memory that stores vocal characteristics of one or more persons; and
   a microphone at one of the first AR display device and the electronic device configured to capture speech by the person wearing the first AR display device, wherein the controller:
      receives the information comprising speech captured by the microphone;
      compares the speech to the vocal characteristics of the one or more persons;
      identifies the person in response to matching vocal characteristics of a particular person of the one or more persons; and
      determines that the person is below the threshold age in response to accessing user information associated with the particular person.

4. The electronic device of claim 1, further comprising a first image capturing device at the first AR display device having a field of view (FOV) of objects in front of the person wearing the first AR display device, wherein the controller:
   receives information, produced by the first image capturing device, related to at least one of height and size related information corresponding to the person; and
   determines that the person wearing the first AR display device is not an adult based on at least one of: (i) the at least one of the height and size correlating to the person not being an adult; or (ii) a distance of the first AR display device from a floor being below an adult height threshold.

5. The electronic device of claim 1, further comprising:
   a memory that stores facial characteristics of one or more persons; and
   a second image capturing device at the first AR display device having a field of view (FOV) of at least a portion of a face of the person wearing the first AR display device, wherein the controller:
      receives the information, captured by the second image capturing device, related to the face of the person;
      compares the face to the facial characteristics of the one or more persons;
      identifies the person in response to matching facial characteristics of a particular person of the one or more persons; and
      determines that the person is below the threshold age in response to accessing user information associated with the particular person.

6. The electronic device of claim 1, further comprising a second image capturing device at the first AR display device having a field of view (FOV) of at least a portion of a face of the person wearing the first AR display device, wherein the controller:
   receives information, from the second image capturing device, related to one or more facial dimensions of the person; and
   determines that the person wearing the first AR display device is not an adult based on the one or more facial dimension correlating to the person not being adult.

7. The electronic device of claim 1, further comprising a third image capturing device and a range finding sensor at the electronic device having a field of view (FOV) of at least a portion of the person wearing the first AR display device, wherein the controller:
   receives information comprises one or more image dimensions of the person imaged by the third image capturing device at distance detected by the range finding sensor;

calculates one of a height and size based on the one or more image dimensions at the distance; and determines that the person wearing the first AR display device is not an adult based on the at least one of the height and size correlating to the person not being an adult.

8. The electronic device of claim 1, wherein the controller:

receives information comprising configuration information of the first AR display device that indicates a size of the first display device; and determines that the person wearing the first AR display device is not an adult based on the size of the first display device correlating to the person not being an adult.

9. A method comprising:

communicatively connecting an electronic device to a first augmented reality (AR) display device of one or more AR display devices; and in response to determining that the electronic device is communicatively coupled to the first AR display:

monitoring or checking for information that indicates, or correlates to, an age of a person wearing the first AR display device being below a threshold age;

in response to receiving information indicating that the person wearing the first AR display device is below the threshold age, selecting customized AR content customized for the person based on the age of the person and any identified personal preferences of the person; and presenting, at the first AR display device, the customized AR content, customized based on the age of the person.

10. The method of claim 9, wherein selecting and presenting the customized AR content further comprises:

identifying an object within a field of view (FOV) of the first AR display device;

identifying a geospatial location of the object; and selecting and presenting the customized AR content that is associated with one or more of an identity of the object and the geospatial location of the object.

11. The method of claim 9, further comprising:

monitoring a microphone at one of the AR display device and the electronic device configured to capture speech by the person wearing the first AR display device;

receiving the information comprising speech captured by the microphone;

comparing the speech to vocal characteristics of one or more persons;

identifying the person in response to matching vocal characteristics of a particular person of the one or more persons; and determining that the person is below the threshold age in response to accessing user information associated with the particular person.

12. The method of claim 9, further comprising:

monitoring a first image capturing device at the AR display device having a field of view (FOV) of objects in front of the person wearing the first AR display device;

receiving information, produced by the first image capturing device, related to at least one of height and size related information corresponding to the person; and determining that the person wearing the first AR display device is not an adult based on at least one of: (i) the at least one of the height and size correlating to the person not being an adult; or (ii) a distance of the AR display device from a floor being below an adult height threshold.

13. The method of claim 9, further comprising:

monitoring a second image capturing device at the AR display device having a field of view (FOV) of at least a portion of a face of the person wearing the first AR display device;

receiving the information, captured by the second image capturing device, related to the face of the person;

comparing the face to facial characteristics of one or more persons;

identifying the person in response to matching facial characteristics of a particular person of the one or more persons; and determining that the person is below the threshold age in response to accessing user information associated with the particular person.

14. The method of claim 9, wherein:

monitoring a second image capturing device at the AR display device having a field of view (FOV) of at least a portion of a face of the person wearing the first AR display device;

receiving information, from the second image capturing device, related to one or more facial dimensions of the person; and determining that the person wearing the first AR display device is not an adult based on the one or more facial dimension correlating to the person not being adult.

15. The method of claim 9, further comprising:

monitoring a third image capturing device and a range finding sensor at the electronic device having a field of view (FOV) of at least a portion of the person wearing the first AR display device;

receiving information comprises one or more image dimensions of the person imaged by the third image capturing device at distance detected by the range finding sensor;

calculating one of a height and size based on the one or more image dimensions at the distance; and determining that the person wearing the first AR display device is not an adult based on the at least one of the height and size correlating to the person not being an adult.

16. The method of claim 9, further comprising:

receiving information comprising configuration information of the first AR display device that indicates a size of the first display device; and determining that the person wearing the first AR display device is not an adult based on the size of the first AR display device correlating to the person not being an adult.

17. A computer program product comprising:

a computer readable storage device; and program code on the computer readable storage device that when executed by a processor associated with an electronic device, the program code enables the electronic device to provide functionality of:

communicatively connecting the electronic device to a first augmented reality (AR) display device of one or more AR display devices; and in response to determining that the electronic device is communicatively coupled to the first AR display:

monitoring or checking for information that indicates, correlates to, an age of a person wearing the first AR display device being below a threshold age;

in response to receiving information indicating that the person wearing the first AR display device is below the threshold age, selecting customized AR content customized for the person based on the age of the person and any identified personal preferences of the person; and presenting, at the first AR display device, the customized AR content, customized based on the age of the person.

18. The computer program product of claim 17, wherein, to select and present the customized AR content, the program code enables the electronic device to provide the functionality of:

identifying an object within a field of view (FOV) of the first AR display device;

identifying a geospatial location of the object; and selecting and presenting the customized AR content that is associated with one or more of an identity of the object and the geospatial location of the object.

19. The computer program product of claim 17, wherein the program code enables the electronic device to provide the functionality of:

monitoring a microphone at one of the AR display device and the electronic device configured to capture speech by the person wearing the first AR display device;

receiving the information comprising speech captured by the microphone;

comparing the speech to vocal characteristics of one or more persons;

identifying the person in response to matching vocal characteristics of a particular person of the one or more persons; and determining that the person is below the threshold age in response to accessing user information associated with the particular person.

20. The computer program product of claim 17, wherein the program code enables the electronic device to provide the functionality of:

monitoring a second image capturing device at the AR display device having a field of view (FOV) of at least a portion of a face of the person wearing the first AR display device;

receiving the information, captured by the second image capturing device, related to the face of the person;

comparing the face to facial characteristics of one or more persons;

identifying the person in response to matching facial characteristics of a particular person of the one or more persons; and determining that the person is below the threshold age in response to accessing user information associated with the particular person.

* * * * *